US010762358B2

(12) United States Patent
Myers et al.

(10) Patent No.: US 10,762,358 B2
(45) Date of Patent: Sep. 1, 2020

(54) REAR CAMERA LANE DETECTION

(71) Applicant: Ford Global Technologies, LLC, Dearborn, MI (US)

(72) Inventors: Scott Vincent Myers, Camarillo, CA (US); Alexandru Mihai Gurghian, Palo Alto, CA (US); Ashley Elizabeth Micks, Mountain View, CA (US); Alexandro Walsh, Mountain View, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 158 days.

(21) Appl. No.: 15/215,282

(22) Filed: Jul. 20, 2016

(65) Prior Publication Data
US 2018/0025234 A1 Jan. 25, 2018

(51) Int. Cl.
| G06K 9/00 | (2006.01) |
| G05D 1/00 | (2006.01) |
| G08G 1/16 | (2006.01) |
| G01C 21/36 | (2006.01) |
| G06T 7/00 | (2017.01) |
| H04N 5/247 | (2006.01) |
| G06K 9/62 | (2006.01) |
| B60R 1/00 | (2006.01) |
| G07C 5/00 | (2006.01) |

(52) U.S. Cl.
CPC ........... *G06K 9/00798* (2013.01); *B60R 1/00* (2013.01); *G05D 1/0088* (2013.01); *G06K 9/6267* (2013.01); *G07C 5/008* (2013.01); *G08G 1/167* (2013.01); *H04N 5/247* (2013.01); *B60R 2300/301* (2013.01); *B60R 2300/307* (2013.01); *B60R 2300/804* (2013.01)

(58) Field of Classification Search
CPC ............. G06K 9/00798; G06K 9/6267; G05D 1/0088; B60R 1/00; B60R 2300/301; B60R 2300/307; B60R 2300/804; H04N 5/247; G07C 5/008; G08G 1/167
USPC .................................................. 348/148, 146
See application file for complete search history.

(56) References Cited

U.S. PATENT DOCUMENTS

| 6,873,911 | B2 * | 3/2005 | Nishira ..................... B60T 7/16 340/436 |
| 7,463,974 | B2 | 12/2008 | Morita |
| 7,706,978 | B2 * | 4/2010 | Schiffmann .......... G01S 7/4026 340/436 |
| 7,974,748 | B2 * | 7/2011 | Goerick ............... B60K 28/165 701/28 |
| 8,194,927 | B2 | 6/2012 | Zhang |

(Continued)

FOREIGN PATENT DOCUMENTS

| JP | 2008276642 | 11/2008 |
| JP | 2016206868 | 12/2016 |

*Primary Examiner* — Susan E. Hodges
(74) *Attorney, Agent, or Firm* — David R. Stevens; Stevens Law Group

(57) ABSTRACT

A method for determining lane information includes receiving perception data from at least two sensors, the at least two sensors including a rear facing camera of a vehicle. The method includes determining, based on the perception data, a number of lanes on a roadway within a field of view captured by the perception data using a neural network. The method includes providing an indication of the number of lanes to an automated driving system or driving assistance system.

20 Claims, 7 Drawing Sheets

(56) References Cited

U.S. PATENT DOCUMENTS

| | | | |
|---|---|---|---|
| 8,457,827 B1 * | 6/2013 | Ferguson | G05D 1/00 |
| | | | 180/169 |
| 8,604,968 B2 * | 12/2013 | Alland | B60R 1/00 |
| | | | 342/70 |
| 8,620,526 B2 | 12/2013 | Schepp | |
| 8,660,734 B2 * | 2/2014 | Zhu | G05D 1/0055 |
| | | | 701/23 |
| 8,825,260 B1 * | 9/2014 | Silver | G01S 17/936 |
| | | | 342/118 |
| 9,132,837 B2 | 9/2015 | Schlensag | |
| 9,170,116 B1 * | 10/2015 | Joshi | G01C 21/32 |
| 9,352,746 B2 * | 5/2016 | Fritsch | B60W 30/12 |
| 10,262,213 B2 * | 4/2019 | Chen | G06K 9/00798 |
| 2010/0209885 A1 * | 8/2010 | Chin | G09B 19/167 |
| | | | 434/65 |
| 2011/0190972 A1 * | 8/2011 | Timmons | G01C 21/34 |
| | | | 701/31.4 |
| 2012/0062747 A1 * | 3/2012 | Zeng | B60W 40/06 |
| | | | 348/149 |
| 2012/0221168 A1 * | 8/2012 | Zeng | G08G 1/09626 |
| | | | 701/1 |
| 2014/0257686 A1 * | 9/2014 | Feldman | G06F 17/00 |
| | | | 701/300 |
| 2015/0025789 A1 * | 1/2015 | Einecke | G01S 13/72 |
| | | | 701/408 |
| 2017/0169627 A1 * | 6/2017 | Kim | G07C 5/0808 |
| 2018/0001890 A1 * | 1/2018 | Ratcliffe | G06K 9/6289 |
| 2018/0004211 A1 * | 1/2018 | Grimm | G01C 21/3407 |
| 2018/0173970 A1 * | 6/2018 | Bayer | G06K 9/629 |

* cited by examiner

REAR CAMERA LANE DETECTION

TECHNICAL FIELD

The present disclosure relates to assisted or automated driving systems, methods, and devices and more particularly relates to lane detection using a rear camera.

BACKGROUND

Automobiles provide a significant portion of transportation for commercial, government, and private entities. Autonomous vehicles and driving assistance systems are currently being developed and deployed to provide safety features, reduce an amount of user input required, or even eliminate user involvement entirely. For example, some driving assistance systems, such as crash avoidance systems, may monitor driving, positions, and a velocity of the vehicle and other objects while a human is driving. When the system detects that a crash or impact is imminent the crash avoidance system may intervene and apply a brake, steer the vehicle, or perform other avoidance or safety maneuvers. As another example, autonomous vehicles may drive and navigate a vehicle with little or no user input. However, due to the dangers involved in driving and the costs of vehicles, it is extremely important that autonomous vehicles and driving assistance systems operate safely and are able to accurately navigate roads in a variety of different types of roadways and driving environments.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION OF PREFERRED EMBODIMENTS

Figure 1:
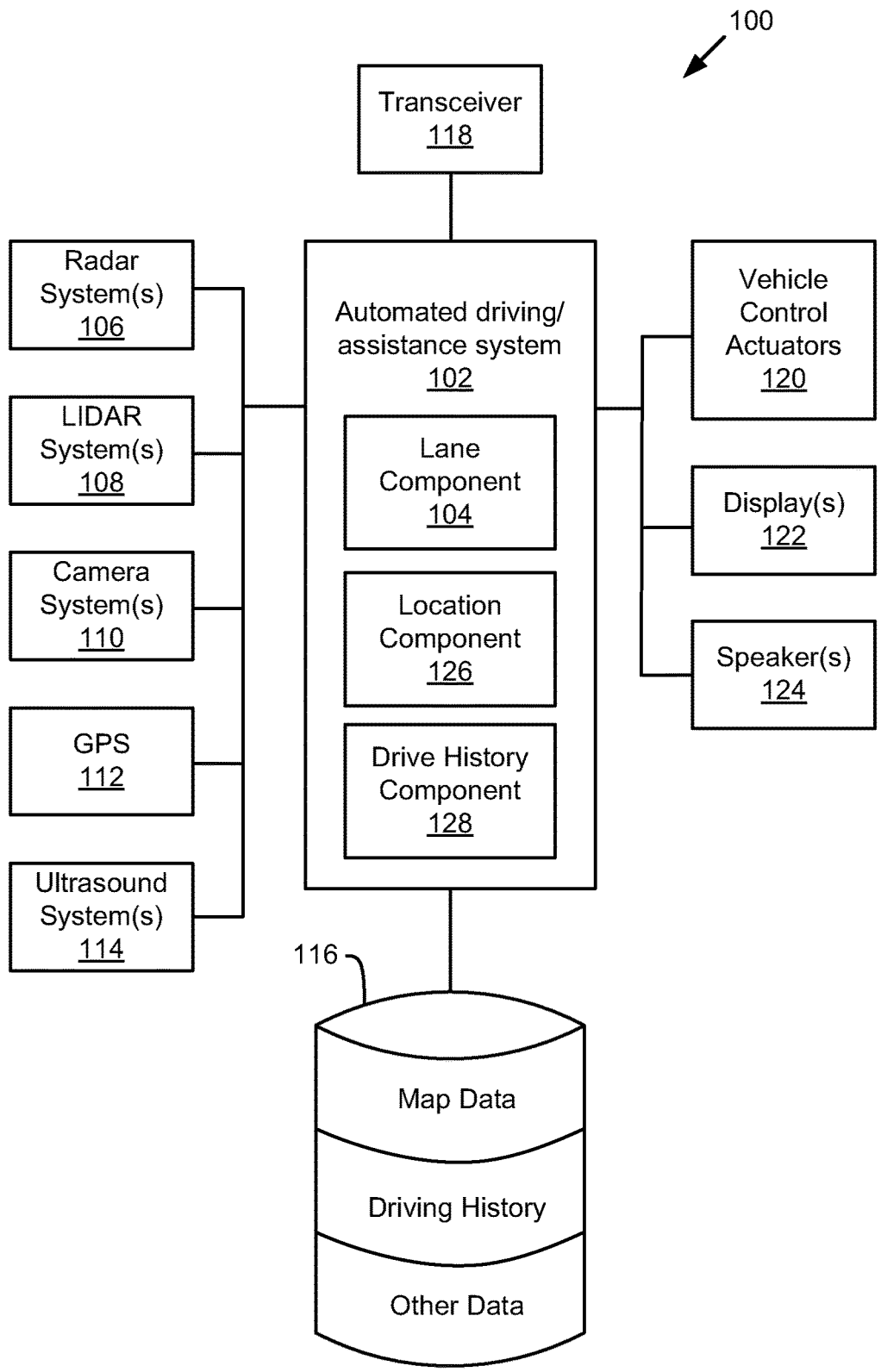
FIG. 1 is a schematic block diagram illustrating an implementation of a vehicle control system that includes an automated driving/assistance system.

An automated driving system or driving assistance system may use data from a plurality of sources during decision making, navigation, or driving to determine optimal paths or maneuvers. For example, an automated driving/assistance system may include sensors to sense a driving environment in real time and/or may access local or remote data storage to obtain specific details about a current location or locations along a planned driving path. In one embodiment, details about locations that a parent vehicle has driven may be stored in a drive history database for later access. For example, when a vehicle returns to a location for which there is drive history data, the automated driving/assistance system may pull data from the drive history to obtain details about a location, which may not (yet) be apparent to vehicle sensors.

Because drive history data can be extremely helpful to an automated driving/assistance system, Applicant has recognized benefits in using available sensors and computing power on a vehicle to obtain drive history data. In the present application, Applicant discloses systems, methods, and devices for obtaining lane line information using a rear camera or back-up camera of a vehicle, which may be stored in a drive history. According to one example embodiment, a system includes a perception data component, a lane component, and a report component. The perception data component is configured to receive perception data from at least two sensors, the at least two sensors comprising a rear facing camera of a vehicle. The lane component is configured to determine, using a neural network, a number of lanes on a roadway within a field of view captured by the perception data. The report component is configured to provide an indication of the number of lanes to an automated driving system or driving assistance system.

Rearward facing cameras on vehicles are typically used for backing up and are idle or unused while a vehicle is moving forward. Embodiments disclosed herein use rear cameras to examine a roadway for determining a number of lanes. For example, some embodiments may cause the rear camera to capture video/images at any time the vehicle is powered on or moving (forward or backward). Information about the number of lanes can be used to inform or update a drive history database. In one embodiment, the data from the rear camera may also be used to detect which lane the vehicle is currently located (i.e., as of the time that an image or perception data was gathered). In one embodiment, detecting a number of lanes, or a current lane, may be done using a machine learning algorithm, such as a deep neural network (DNN).

In one embodiment, a driving system may detect how many lanes wide a roadway is while in reverse or during the camera idle time while the vehicle is moving forward. The system may also use the rear camera to detect which lane the vehicle is currently in. Additional sensors may be used with the rear camera to generate fused sensor data. For example, a light detection and ranging (LIDAR) system may be used to gather data, such as to measure reflectivity of surfaces, which may improve robustness and localization-precision of the lane markings. Radar may be used to detect curbs or the edges of a roadway. Fusion of LIDAR, radar, and/or rear camera data can allow for robust detection of lane markings in a variety of different conditions.

In one embodiment, when no lane markings are present, a system may switch to a LIDAR-only mode or a radar only mode (or LIDAR and radar only mode), as a LIDAR system or radar system may be able to detect the shoulders of the lane. In order to determine the number of lanes, the distance between the shoulders may be measured and divided by a standard lane-width. Any fractional remainder may be split and allotted between lanes or road shoulders. In one embodiment, LIDAR and/or radar may be used to perform road-plane segmentation and thereby determining the road's slope in both horizontal and vertical direction. Applicant considers the use and/or fusion of other types of sensor data for lane number determinations as within the scope of the present disclosure.

The lane numbers and/or current lane may be provided to an automated driving system or driving assistance system. For example, the system may use the lane information to determine how to drive the vehicle, avoid obstacles, or the like. The number of lanes and current lane may be broadcast to all controllers of an automated driving system or driving assistance system for use in decision making, navigation, or the like. In one embodiment, the current number of lanes as well as the currently occupied lane is used to compute avoidance options for safety as well as the autonomous trajectory. As another example, a notification may be provided to a user (such as on a heads-up display or navigation screen) about the number of lanes and/or the current lane of the vehicle.

In one embodiment, the number of lanes at a specific location or along a specific roadway is stored in a drive history database for later retrieval. In one embodiment, the number of lanes may be uploaded to a remote server or cloud location. The remote location may include storage accessible via a mobile communications network and/or the Internet. The remote storage location may also receive and store data from a large number of other vehicles to create a cloud-based drive history that is shared among different vehicles. The data may be aggregated or compiled to allow vehicles to access the shared data when they have access to communication networks. On subsequent trips, the current number of lanes can be retrieved from either a local drive history database or cloud drive history database. In one embodiment, the number of lanes is broadcast to all controllers on a vehicle control bus of the vehicle for determination of driving paths, or the like.

Further embodiments and examples will be discussed in relation to the figures below.

Referring now to the figures, FIG. 1 illustrates an example vehicle control system 100. The vehicle control system 100 includes an automated driving/assistance system 102. The automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, or any other driving or auxiliary systems of the vehicle. In another example, the automated driving/assistance system 102 may not be able to provide any control of the driving (e.g., steering, acceleration, or braking), but may provide notifications and alerts to assist a human driver in driving safely. For example, the automated driving/assistance system 102 may include one or more controllers (such as those discussed herein) that provide or receive data over a controller bus and use the data to determine actions to be performed and/or provide instructions or signals to initiate those actions. The automated driving/assistance system 102 may include a lane component 104 that is configured to determine a number of lanes and/or a current lane based on images or video from a rear facing camera.

The vehicle control system 100 also includes one or more sensor systems/devices for detecting a presence of nearby objects, lane markers, and/or or determining a location of a parent vehicle (e.g., a vehicle that includes the vehicle control system 100). For example, the vehicle control system 100 may include radar systems 106, one or more LIDAR systems 108, one or more camera systems 110, a global positioning system (GPS) 112, and/or ultrasound systems 114. The vehicle control system 100 may include a data store 116 for storing relevant or useful data for navigation and safety such as map data, driving history (i.e., drive history), or other data. The vehicle control system 100 may also include a transceiver 118 for wireless communication with a mobile or wireless network, other vehicles, infrastructure, cloud or remote computing or storage resources, or any other communication system.

The vehicle control system 100 may include vehicle control actuators 120 to control various aspects of the driving of the vehicle such as electric motors, switches or other actuators, to control braking, acceleration, steering or the like. The vehicle control system 100 may include one or more displays 122, speakers 124, or other devices so that notifications to a human driver or passenger may be provided. A display 122 may include a heads-up display, dashboard display or indicator, a display screen, or any other visual indicator which may be seen by a driver or passenger of a vehicle. The speakers 124 may include one or more speakers of a sound system of a vehicle or may include a speaker dedicated to driver notification. The vehicle control actuators 120, displays 122, speakers 124, or other parts of the vehicle control system 100 may be controlled by one or more of the controllers of the automated driving/assistance system 102.

In one embodiment, the automated driving/assistance system 102 is configured to control driving or navigation of a parent vehicle. For example, the automated driving/assistance system 102 may control the vehicle control actuators 120 to drive a path within lanes on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time. In one embodiment, the automated driving/assistance system 102 also uses information stored in a driving history (locally or remotely) for determining conditions in a current environment. The automated driving/assistance system 102 may implement one or more algorithms, applications, programs, or functionality that drive or assist in driving the vehicle.

In one embodiment, the camera systems 110 include a rear facing camera, such as a backup-camera. The camera systems 110 may include cameras facing in different directions to provide different views and different fields of view for areas near or around the vehicle. For example, some cameras may face forward, sideward, rearward, at angles, or in any other direction. In one embodiment, images from a rear camera may be used to determine a number of lanes on a roadway and/or a current lane for the vehicle.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
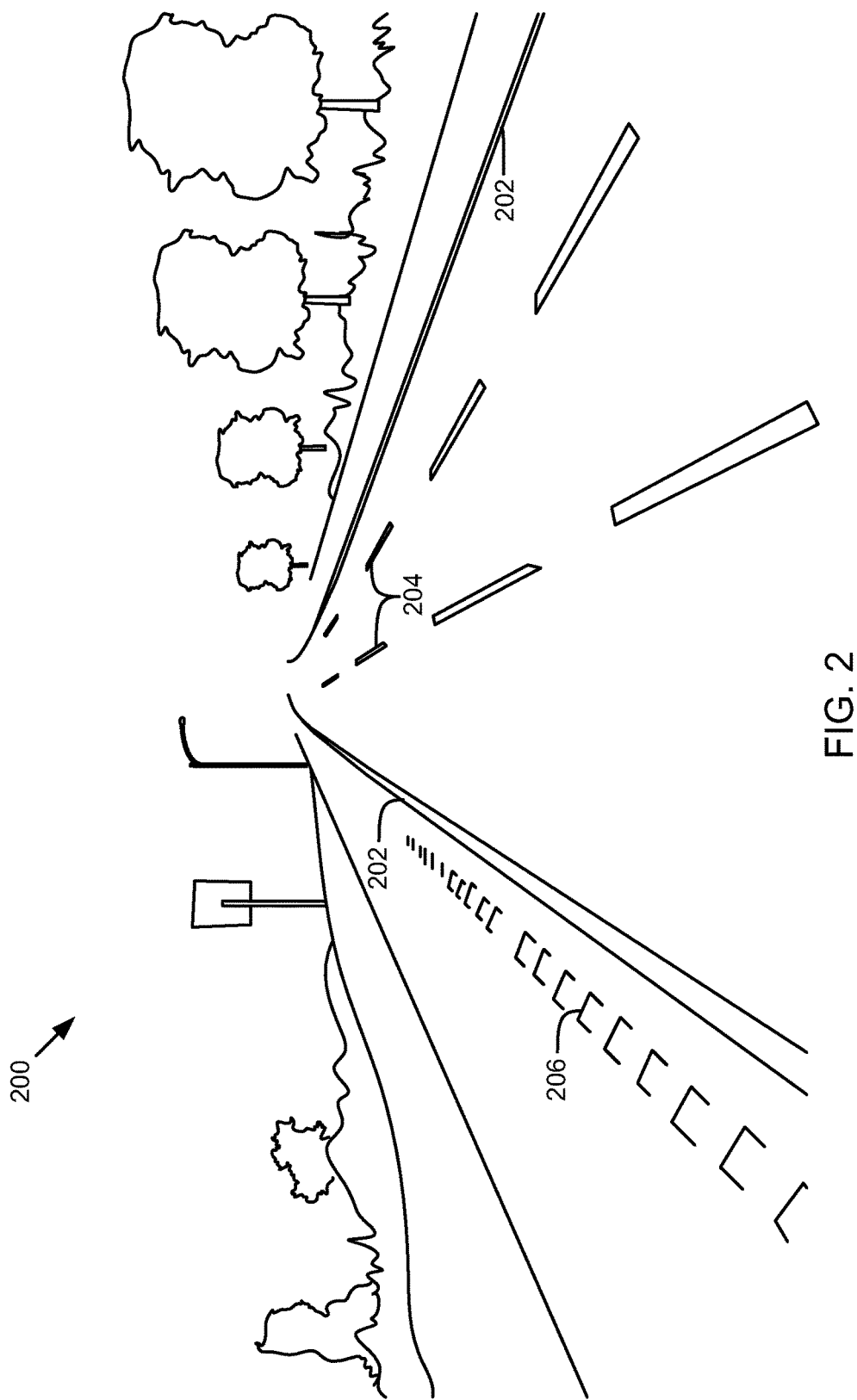
FIG. 2 illustrates a perspective view of an example road environment.

FIG. 2 illustrates a perspective view of a roadway 200. The view illustrates what may be captured in an image by a rear facing camera, such as a backup camera, of a vehicle. The roadway 200 includes a plurality of markings including lane divider markings 204, road boundary markings 202, and rumble strips 206. The roadway 200 may include a roadway for a freeway or highway where all lanes of the roadway 200 proceed in the same direction. The markings may include mechanical or non-mechanical markings. Mechanical markings may include reflectors, rumble strips (e.g., 206), or the like. Non-mechanical markings may include colored lines or markings (white, yellow, etc.) created with paint, plastics, tape, epoxy, or the like.

In one embodiment, a lane component 104 is configured to detect and determine a number of lanes on the roadway 200. For example, the lane component 104 may identify the road boundary markings 202 and, based on two sets of lane divider markings 204, determine that there are three lanes. It is important to note that images captured using a rear facing camera obtain information that may be reversed from that in a forward facing camera or from the perspective of a human driver. For example, if a center line is generally to the left of a vehicle in a specific driving location, a rear facing camera may capture images showing the center line in a right side of the image. Thus, all lane number, lane positioning, and lane detection algorithms that use data from rear facing cameras may need to reverse orders or detection rules in order to reflect a common format from other sensors or from the perspective of a driver.

The lane component 104 may use the presence of rumble strips 206, as well as a marking color (white, yellow, etc.) or pattern (broken or solid line) to determine boundaries of a roadway (or outermost lane boundary of a roadway). For example, the road boundary markings 202 include a solid line pattern while the lane divider markings 204 include a broken line pattern. The lane component 104 may identify solid lines as boundary markings and broken lines as lane divider markings. Other types of lane markings (such as reflectors) may be identified as road boundary markings, center lines, lane divider, or the like based on color, frequency, or the like. In light of the present disclosure, one of skill in the art will understand that detection of marking type with respect to boundaries may be applied to any type of lane marking whether a mechanical or a non-mechanical marking.

As illustrated in FIG. 1, the automated driving/assistance system 102 may also include a location component 126 and a drive history component 128. The location component 126 may determine a current location of the vehicle in which the system 100 is located. For example, the location component 126 may receive location information from the GPS 112 and/or the transceiver 118 that indicates a location of the vehicle. The drive history component 128 is configured to retrieve data from a drive history (i.e., driving history) and provide it to other controllers or portions of the system 100. For example, data in a drive history (stored locally in the data store 116 or remotely stored at a location accessible over a network using the transceiver 118) may be retrieved for a current or future location to inform the automated driving/assistances system 102 of road or driving conditions. In one embodiment, the drive history component 128 is configured to retrieve drive history data from a remote storage location. The drive history may indicate a number of lanes or a slope for a current location of a vehicle. In one embodiment, the drive history component 128 is configured to broadcast the number of lanes or the slope for the current location to one or more vehicle controllers of an automated driving system or driving assistance system. For example, the controllers may use the data from the drive history to determine how to control the vehicle to drive a section of road. For example, the controllers may determine a steering angle or change in steering angle, a speed or change in speed, acceleration, braking, or any other control input/output values to control a vehicle.

Figure 3:
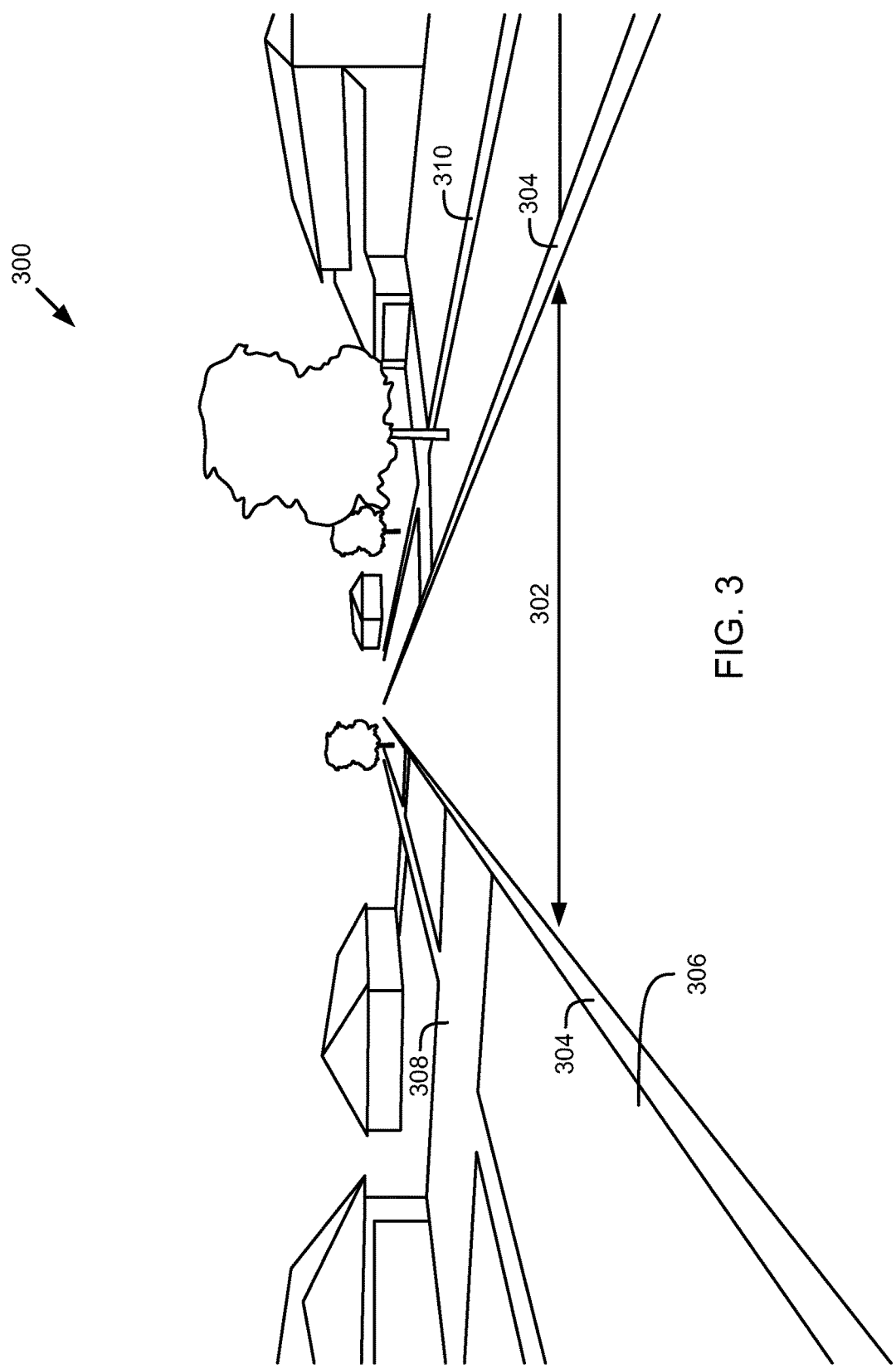
FIG. 3 illustrates a perspective view of another example road environment.

FIG. 3 illustrates a perspective view of a roadway 300 in a residential area, according to one embodiment. The view illustrates what may be captured in an image by a rear facing camera, such as a backup camera, of a vehicle driving through a residential area. Because the roadway 300 does not include traditional mechanical or non-mechanical lane markers, such as lines or reflectors, the number of lanes must be determined based on other factors, such as a width 302 of the roadway 300. The lane component 104 may determine the width 302 of the roadway based on the edges of the road. For example, curbs 304 may be detected on either side of the roadway 300 using images from a rear camera and/or data from another sensing system, such as LIDAR data or radar data. LIDAR data and radar data can be particularly helpful in detecting curbs or other three-dimensional road or environmental features.

In one embodiment, fused data, based on images and other sensor data may be generated to determine a location of curbs, a shoulder, or the like near roadway. For example, a location of the edge of a roadway may be determined based on an image processing techniques such as edge detection or boundary detection or based on LIDAR data. The location or road width determined based on the image data may be averaged (e.g., using a weighted average) with the location or road with determined based on the LIDAR data. The computed/determined width may be divided by a stored lane width to determine how many lanes are present on the roadway 300. For example, the stored lane width may include an average or legal lane width that is known for a geographic location. In one embodiment, the number of lanes may also be determined based on a road environment. For example, if the vehicle is in a freeway environment (such as that shown in FIG. 2) lane widths may be larger than those in residential or industrial environments. The environment may be determined based on the presence of curbs 304, parking strips 306, driveways 308 or connecting pathways, sidewalks 310, houses, buildings, trees, or the like. For example, the presence of houses and/or sidewalks within a specified distance of the road may trigger the use of a smaller average lane width. In one embodiment, an absence of lane or other road markings may indicate that a smaller lane width is to be used.

Figure 4:
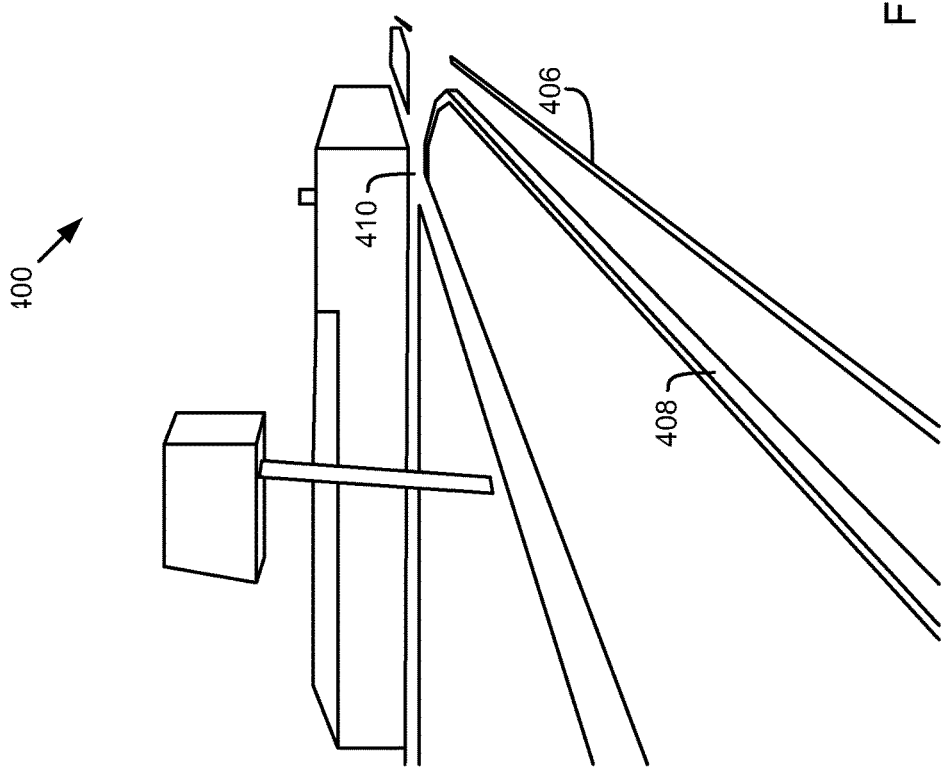
FIG. 4 illustrates a perspective view of yet another example road environment.

FIG. 4 illustrates a perspective view of a roadway 400 in a commercial environment, according to one embodiment. The view illustrates what may be captured in an image by a rear facing camera, such as a backup camera, of a vehicle. Similarly, a LIDAR or radar system may capture information about one or more of the features of the roadway 400 or in the environment of the roadway 400. The roadway 400 is a bi-directional roadway with a plurality of markings including center line markings 402, lane divider markings 404, and road boundary markings 406. A curb 408 is located near the roadway 400 and a cross-street 410 intersects with the roadway 400. In one embodiment, a lane component 104 is configured to detect and determine a number of lanes on the roadway 400. For example, the lane component 104 may identify the road boundary markings 406 and, based on the two sets of lane divider markings 404 and center line markings 402, determine that there are four lanes on the roadway.

The lane component 104 may also determine a direction of travel for each lane based on the presence of the center line markings 402. The lane component 104 may identify the center line markings 402 based on line pattern (e.g., double solid or double broken lines) or on color (e.g., yellow versus white). The lane component 104 may determine that the lanes on one side of the center line markings 402 of the roadway 400 is for traveling in a first direction and that lanes on the other side of the center line markings 402 of the roadway 400 are for traveling in a second, opposite direction.

The lane numbers, travel directions, or other details may be stored in a local or remote drive history for later access. In one embodiment, the number of lanes, their corresponding directions, or other lane information may be provided to a control system or automated driving/assistance system for determination of a driving path or collision avoidance maneuvers. For example, an automated driving/assistance system may determine if there is an available maneuver to avoid collision with an object, pedestrian, or other vehicle that remains on the roadway 400, but avoids entering an oncoming lane. In some cases, entering an oncoming lane or exiting the roadway 400 may be preferable to alternative paths that may lead to an imminent collision.

Figure 5:
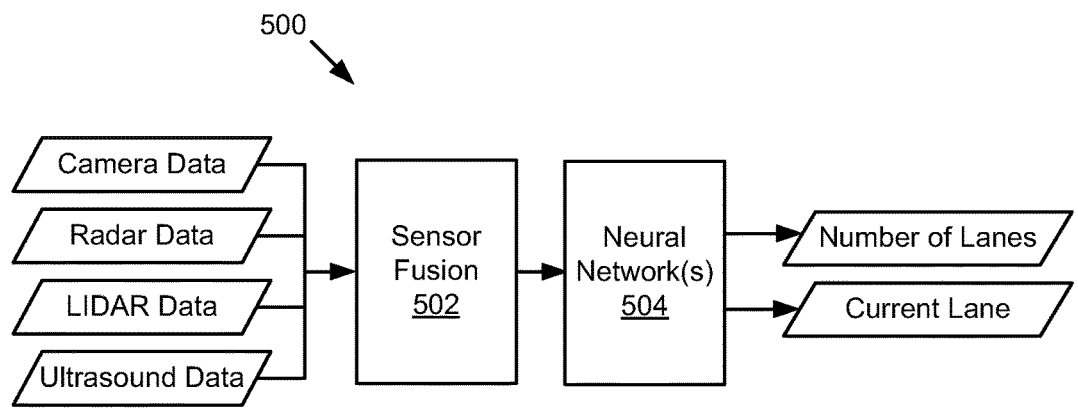
FIG. 5 is a schematic block diagram illustrating data flow for determining lane information, according to one implementation.

FIG. 5 is a schematic block diagram illustrating data flow for a method 500 for determining a number of lanes and/or a current lane for a vehicle. A plurality of types of perception data including camera data, radar data, LIDAR data, and/or ultrasound data may be received and combined for sensor fusion 502. The camera data may include data from a rear facing camera such as a backup camera. Sensor fusion 502 may generate information about lane marking location, curb location, a road shoulder, or the location of any other environmental object or feature based on combined perception data. For example, if only camera data and LIDAR data is received, then a location for a lane marking may be determined based on an average or other combination of camera and LIDAR data. The sensor fusion 502 may use averages or weighted averages for different data types to determine fused or combined data. If only one type of data is received, the sensor fusion may pass through that raw data or modify the raw data to match a format expected by neural networks 504. The neural networks 504 may receive the raw or fused data and process it to generate a number of lanes for a roadway and/or a current lane for a vehicle in the roadway.

The neural networks 504 may include one or more networks that compute one or more outputs including lane numbers and current lanes. Because rear facing camera data may be used, the number of lanes may be based on a section of roadway that the vehicle has already passed over. However, this data may still be useful for automated driving or assisted driving as it may help inform assumptions about the number of lanes in front of a vehicle. Additionally, storage of the number of lanes in a drive history may be retrieved at a later time when the user is approaching or re-approaching a road and the previously stored lane data may assist a vehicle in determining the features of a roadway along which the vehicle is soon to travel. In one embodiment, the neural networks 504 include one or more deep neural networks that have been trained for detecting a number of lanes and/or a current lane of a vehicle within the detected lanes.

Figure 6:
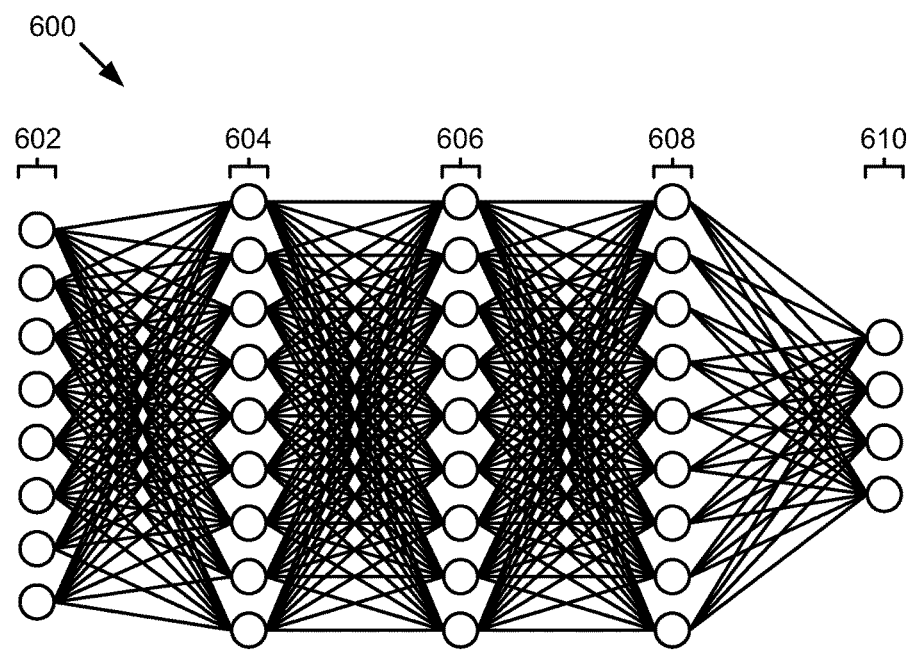
FIG. 6 is a schematic diagram illustrating example configuration of a deep neural network, according to one implementation.

FIG. 6 is a schematic diagram illustrating configuration of a deep neural network 600. Deep neural networks have gained attention in the recent years, as they have outperformed traditional machine learning approaches in challenging tasks like image classification and speech recognition. Deep neural networks are feed-forward computational graphs with input nodes (such as input nodes 602), one or more hidden layers (such as hidden layers 604, 606, and 608) and output nodes (such as output nodes 610). For classification of contents or information about an image, pixel-values of the input image are assigned to the input nodes, and then fed through the hidden layers 604, 606, 608 of the network, passing a number of non-linear transformations. At the end of the computation, the output nodes 610 yield values that correspond to the class inferred by the neural network. The number of input nodes 602, hidden layers 604-608, and output notes 610 is illustrative only. For example, larger images may include an input node 602 for each pixel, and thus may have hundreds, thousands, or other number of input notes.

According to one embodiment, a deep neural network 600 of FIG. 6 may be used to classify the content(s) of an image into four different classes: a first class, a second class, a third class, and a fourth class. According to the present disclosure, a similar or differently sized neural network may be able to output a value indicating a number of lanes in an image. For example, the first class may correspond to one lane, the second class may correspond to two lanes, the third class may correspond to three lanes, and the fourth class may correspond to four lanes. This is illustrative only as a neural network to classify the number of lanes based on an image may include hundreds or thousands of pixels and may need to detect a larger number of lanes (e.g., ten or more in some embodiments). Thus, a neural network to classify the number of lanes may require hundreds or thousands of nodes at an input layer and/or more than four output nodes.

For example, feeding a raw image of the roadway 200 of FIG. 2 into the network may yield the highest probability for third class, or three lanes. Therefore, a neural network may enable a computing system to automatically infer the number of lanes within an image. Similar techniques or principles may be used to infer information about or detecting pedestrians, traffic signs, a current lane, and or the like.

In order for deep neural network to be able to distinguish between any of the desired classes, the neural network needs to be trained based on examples. For example, if a deep neural network that is able to classify a number of lanes in a picture is to be created, then a large amount of example images (hundred to thousand for roadways with different numbers of lanes) with a label assigned to each image that corresponds to the lane number within each specific the image may be needed. The labeled data can be a large challenge for training deep neural networks as humans are required to assign labels to the training images (which often go into the millions). Thus, the time and equipment to acquire the image as well as hand label them can be expensive. Once the images with labels (training data) are acquired, the network may be trained. One example algorithm for training includes the back propagation-algorithm that uses the images, including the large number of images with labels. The back propagation-algorithm can take several hours, days, or weeks to be performed.

Figure 7:
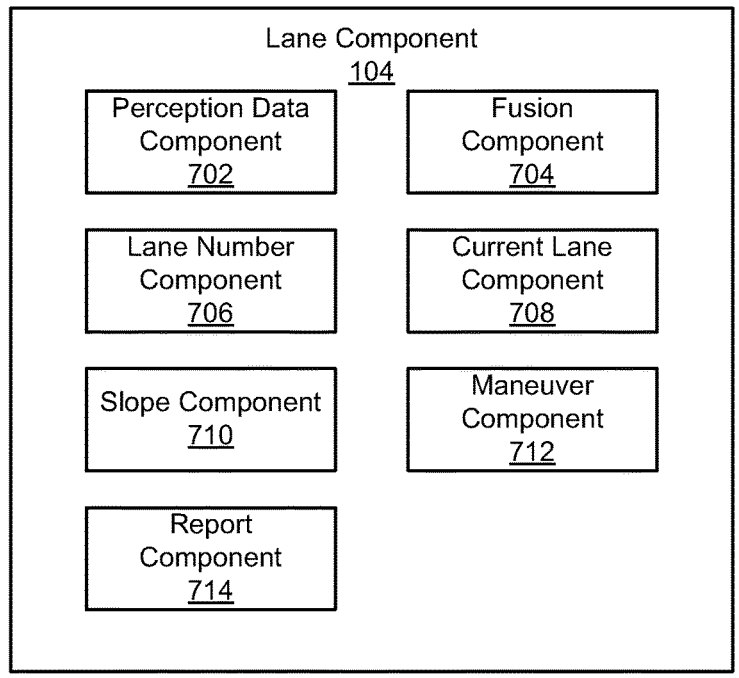
FIG. 7 is a schematic block diagram illustrating example components of a lane component, according to one implementation.

Turning to FIG. 7, a schematic block diagram illustrating components of a lane component 104, according to one embodiment, is shown. The lane component 104 includes a perception data component 702, a fusion component 704, a lane number component 706, a current lane component 708, a slope component 710, a maneuver component 712, and a report component 714. The components 702-714 are given by way of illustration only and may not all be included in all embodiments. In fact, some embodiments may include only one or any combination of two or more of the components 702-714. Some of the components 702-714 may be located outside the lane component 104, such as within the automated driving/assistance system 102 or elsewhere.

The perception data component 702 is configured to obtain or receive perception data from one or more sensors or sensing systems of a vehicle or a vehicle control system. In one embodiment, the perception data component 702 receives perception data that includes information about an environment of a vehicle or vehicle control system. Example perception data includes data from LIDAR, radar, camera, ultrasound, infrared, or other systems. In one embodiment, the perception data component 702 is configured to receive perception data from at least two sensors or sensing systems. In one embodiment, at least one of the sensors or sensing systems includes a rear facing camera of a vehicle. Data from other sensors may also be received such as data from a LIDAR, radar, ultrasound, infrared, or other system.

The fusion component 704 is configured to perform data fusion with perception data obtained by the perception data component 702. For example, the fusion component 704 may populate fields or entries expected by one or more of the other components 702, 706-714 with data from the perception data. For example, if an image is expected (but may not be required) by the lane number component 706, the fusion component 704 may provide an image into a table or matrix that is to be provided to the lane component. Similarly, if LIDAR data could be used by a component, the fusion component 704 may provide the LIDAR data into a different field or area of the table or matrix. The fusion component 704 may assemble perception data from different data sources for use by a lane number component 706, current lane component 708, and/or a slope component 710 for processing using a neural network or other machine learning algorithm or model.

In one embodiment, the fusion component 704 is configured to generate fused sensor data based on the perception data from at least two sensors. For example, the fused sensor data may include a location of a lane marking, a number of lanes, or the like. For example, the fusion component 704 may determine the presence or location of one or more lane lines based on data from multiple sensors. For example, data from one sensor may indicate the presence of a lane marking with high confidence while data from another sensor may indicate the presence of a lane marking with low or medium confidence. Based on the combined data, the fusion component 704 may determine that a lane marking is present. Similarly, data from one sensor may indicate a first location of a lane marking while data from another sensor may indicate that the lane marking has a slightly different location. The fusion component 704 may determine a new or modified location that has been computed based on the combined data.

The lane number component 706 is configured to determine a number of lanes on a roadway based on the perception data. In one embodiment, the lane number component 706 uses perception data that has been fused or processed by the fusion component 704. In another embodiment, the lane number component 706 uses raw data or data that has not been fused or processed by the fusion component 704. In one embodiment, the lane number component 706 includes one or more neural networks that have been trained to detect a number of lanes within an image, LIDAR frame, radar frame, or other frame or unit of sensor data. Other embodiments may include other types of machine learning algorithms or models for determining the number of lanes. The lane number component 706 may receive the perception data as input and provide an output that indicates a number of inferred lanes. The output of the neural network or other machine learning algorithm may indicate to other components or systems how many lanes were present within a field of view of the perception sensors when the perception data was captured/obtained.

The current lane component 708 is configured to determine a current lane of the vehicle. For example, the current lane component 708 may determine a current lane, within the number of lanes detected by the lane number component, of a vehicle based on the perception data. For example, the current lane component 708 may determine, based on angles formed by lane lines or consecutive lane markers, location within an image or LIDAR frame, or the like, a current lane of the vehicle. The current lane may include a number indicating which of the detected lanes (e.g., from left to right or right to left with respect to the driving direction of the vehicle) the vehicle is located. For example, if the lane number component 706 detects six lanes, the current lane component 708 may output a "1" to indicate that the vehicle is in the right-most lane, a "2" to indicate that the vehicle is in the middle lane, or a "3" to indicate that the vehicle is in a left most lane. This configuration is given by way of example only and other types of output may be provided in other embodiments within the scope of the present disclosure.

According to one embodiment, the current lane component 708 uses a deep neural network that has been trained to determine the current lane. For example, a neural network of the current lane component 708 may receive an image, LIDAR frame, and/or other perception data along with the number of lanes output by the lane number component 706. Based on that input the neural network may output a number or other indication of what lane the vehicle is likely located. The current lane indication may indicate a lane position of the vehicle at a time when the perception data was obtained.

The slope component 710 is configured to determine a slope of a roadway. In one embodiment, the slope component 710 may perform road-plane segmentation based on data from a LIDAR or radar system. Based on the road-plane segmentation, the slope component 710 may determine a slope of the roadway in a direction of travel (i.e., a vertical direction) or in a direction perpendicular to travel (i.e., a horizontal direction). For example, the slope of the roadway along a direction of travel may be helpful in determining an amount of braking or acceleration that may be needed to perform a certain maneuver or achieve a specific velocity. The three-dimensional data obtained by a LIDAR or radar system may enable accurate calculation of the slope of a roadway.

The maneuver component 712 is configured to determine a driving path or maneuver to be performed by a vehicle or driving system. For example, the maneuver component 712 may determine a driving maneuver to follow a path or avoid a collision. The maneuver component 712 may determine a maneuver or path based on a number of lanes, a current lane, and/or a road slope. For example, the maneuver may include a maneuver that stays on a roadway, stays within lanes of a roadway, or stays within lanes traveling in a same direction as a current lane of the vehicle. The maneuver component 712 may determine maneuvers that include a driving trajectory or collision avoidance option based on the number of lanes.

The report component 714 is configured to report lane or roadway information to an automated driving system or driving assistance system. For example, the report component 714 may provide an indication of a number of lanes, a current lane and/or road slope. The report component 714 may provide any data obtained or determined by the perception data component 702, fusion component 704, the lane number component 706, the current lane component 708, the slope component 710, and/or the maneuver component 712. In one embodiment, the report component 714 provides information about a current lane, number of lanes, slope, and/or determined maneuver in real-time to the automated driving/assistance system 102 of FIG. 1 so that real-time driving decisions and maneuvers may be performed. For example, the report component 714 may provide an indication of the number of lanes to an automated driving system or driving assistance system. Additionally, the report component 714 may provide reports or data to a drive history component 128 or for storage in a local or remote driving history. For example, the report component 714 or the drive history component 128 may upload an indication of the number of lanes for a specific location to a remote storage location.

Figure 8:
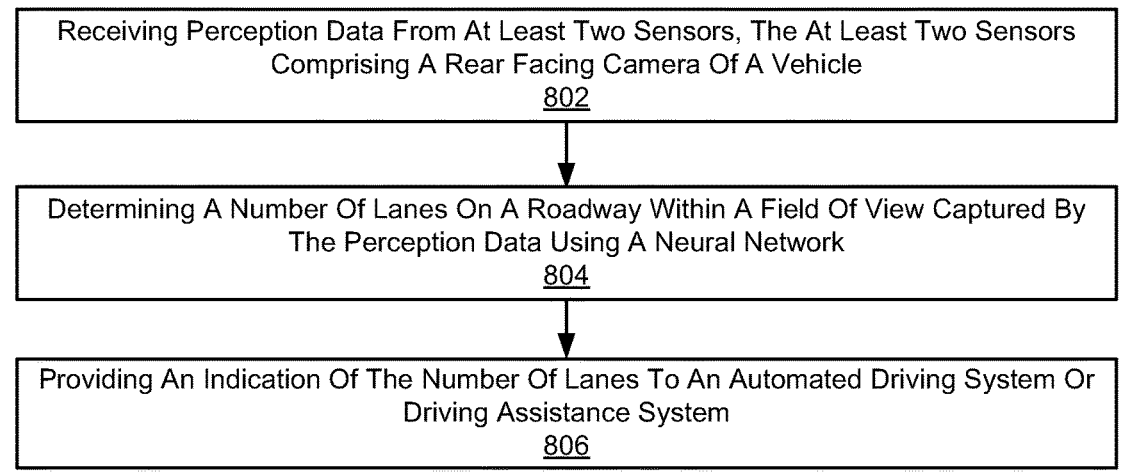
FIG. 8 is a schematic block diagram illustrating a method for determining lane information, according to one implementation.

FIG. 8 is a schematic flow chart diagram illustrating a method 800 for determining lane information. The method 800 may be performed by a lane component, automated driving/assistances system, or vehicle control system, such as the lane component 104, automated driving/assistances system 102, or vehicle control system 100 of FIG. 1.

The method 800 begins and a perception data component 702 receives at 802 perception data from at least two sensors. The at least two sensors include a rear facing camera of a vehicle. For example, the perception data may include information from a rear facing camera with data from one or more of a radar system, LIDAR system, ultrasound sensing system, infrared sensing system, or the like. A lane number component 706 determines at 804, based on perception data, a number of lanes on a roadway within a field of view captured by the perception data. The lane number component 706 may include a deep neural network that receives perception data and provides an indication of a number of lanes viewable/shown in the perception data. In one embodiment, the lane number component 706 may determine the number of lanes based on fused data from a plurality of sensors or sensor systems. A report component 714 provides at 806 an indication of the number of lanes to an automated driving system or driving assistance system. For example, the number of lanes may be gathered for determination of a driving path or maneuver or for storage in a remote or local drive history.

Figure 9:
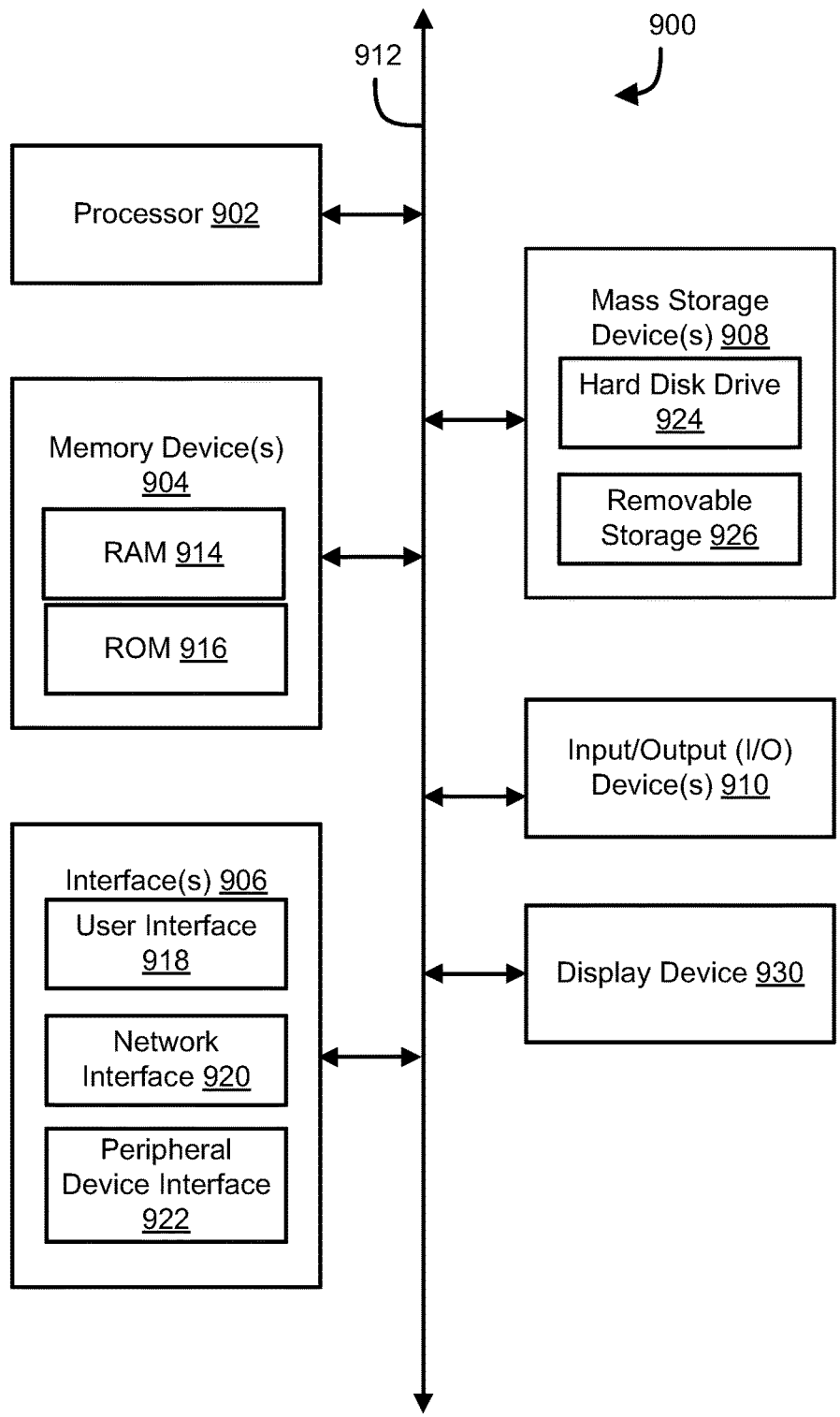
FIG. 9 is a schematic block diagram illustrating a computing system, according to one implementation.
Figure 4:
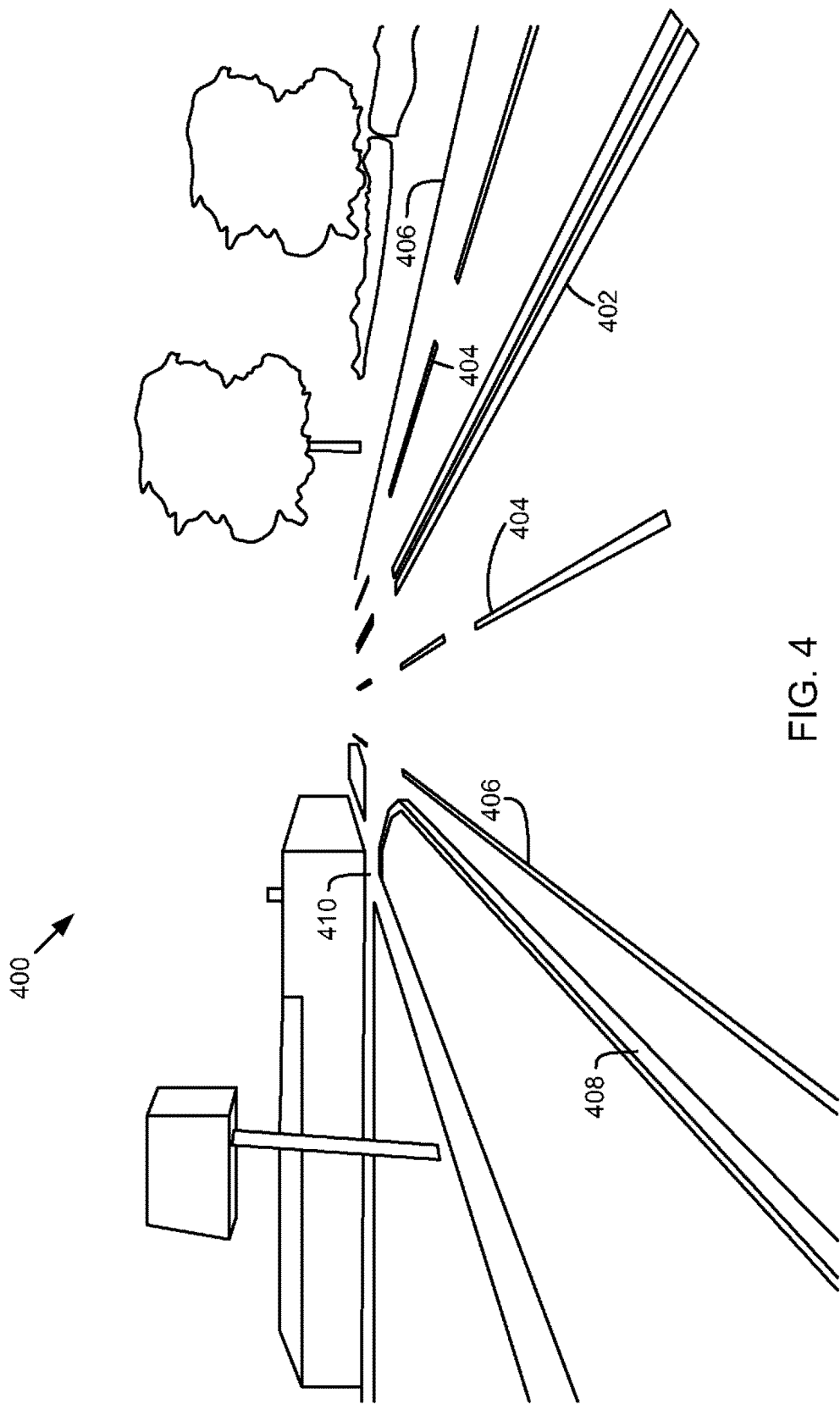

Referring now to FIG. 9, a block diagram of an example computing device 900 is illustrated. Computing device 900 may be used to perform various procedures, such as those discussed herein. Computing device 900 can function as a lane component 104, automated driving/assistance system 102, server, or any other computing entity. Computing device 900 can perform various monitoring functions as discussed herein, and can execute one or more application programs, such as the application programs or functionality described herein. Computing device 900 can be any of a wide variety of computing devices, such as a desktop computer, a notebook computer, a server computer, a handheld computer, tablet computer and the like.

Computing device 900 includes one or more processor(s) 902, one or more memory device(s) 904, one or more interface(s) 906, one or more mass storage device(s) 908, one or more Input/Output (I/O) device(s) 910, and a display device 930 all of which are coupled to a bus 912. Processor(s) 902 include one or more processors or controllers that execute instructions stored in memory device(s) 904 and/or mass storage device(s) 908. Processor(s) 902 may also include various types of computer-readable media, such as cache memory.

Memory device(s) 904 include various computer-readable media, such as volatile memory (e.g., random access memory (RAM) 914) and/or nonvolatile memory (e.g., read-only memory (ROM) 916). Memory device(s) 904 may also include rewritable ROM, such as Flash memory.

Mass storage device(s) 908 include various computer readable media, such as magnetic tapes, magnetic disks, optical disks, solid-state memory (e.g., Flash memory), and so forth. As shown in FIG. 9, a particular mass storage device is a hard disk drive 924. Various drives may also be included in mass storage device(s) 908 to enable reading from and/or writing to the various computer readable media. Mass storage device(s) 908 include removable media 926 and/or non-removable media.

I/O device(s) 910 include various devices that allow data and/or other information to be input to or retrieved from computing device 900. Example I/O device(s) 910 include cursor control devices, keyboards, keypads, microphones, monitors or other display devices, speakers, printers, network interface cards, modems, and the like.

Display device 930 includes any type of device capable of displaying information to one or more users of computing device 900. Examples of display device 930 include a monitor, display terminal, video projection device, and the like.

Interface(s) 906 include various interfaces that allow computing device 900 to interact with other systems, devices, or computing environments. Example interface(s) 906 may include any number of different network interfaces 920, such as interfaces to local area networks (LANs), wide area networks (WANs), wireless networks, and the Internet. Other interface(s) include user interface 918 and peripheral device interface 922. The interface(s) 906 may also include one or more user interface elements 918. The interface(s) 906 may also include one or more peripheral interfaces such as interfaces for printers, pointing devices (mice, track pad, or any suitable user interface now known to those of ordinary skill in the field, or later discovered), keyboards, and the like.

Bus 912 allows processor(s) 902, memory device(s) 904, interface(s) 906, mass storage device(s) 908, and I/O device(s) 910 to communicate with one another, as well as other devices or components coupled to bus 912. Bus 912 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 900, and are executed by processor(s) 902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method that includes receiving perception data from at least two sensors, the at least two sensors comprising a rear facing camera of a vehicle. The method includes determining, based on the perception data, a number of lanes on a roadway within a field of view captured by the perception data using a neural network. The method also includes providing an indication of the number of lanes to an automated driving system or driving assistance system.

In Example 2, the method of Example 1 further includes determining a current lane in which the vehicle is located using a neural network, wherein the current lane corresponds to a lane position of the vehicle at a time when the perception data was obtained.

In Example 3, the at least two sensors in any of Examples 1-2 include the rear facing camera and one or more of a LIDAR system, a radar system, an ultrasound sensing system, or an infrared camera system.

In Example 4, method in any of Examples 1-3 further includes determining, based on the perception data, road slope in one or more of a vertical direction or a horizontal direction.

In Example 5, the method in any of Examples 1-4 further includes determining one or more of a driving trajectory or collision avoidance options based on the number of lanes.

In Example 6, method in any of Examples 1-5 further includes storing the indication of the number of lanes in a drive history for later access.

In Example 7, the method in any of Examples 1-6 further includes uploading the indication of the number of lanes to a remote storage location.

In Example 8, method in Example 7 further includes: determining a current location of the vehicle; retrieving drive history data from the remote storage location, wherein the drive history indicates a number of lanes for the current location; and broadcasting the number of lanes for the current location to one or more vehicle controllers of an automated driving system or driving assistance system.

Example 9 is a system that includes a perception data component, a lane number component, and a report component. The perception data component is configured to receive perception data from at least two sensors, the at least two sensors comprising a rear facing camera of a vehicle. The lane number component is configured to determine, using a neural network, a number of lanes on a roadway within a field of view captured by the perception data. The report component is configured to provide an indication of the number of lanes to an automated driving system or driving assistance system.

In Example 10, the system of Example 9 further includes a current lane component configured to determine a current lane in which the vehicle is located using a neural network, wherein the current lane corresponds to a lane position of the vehicle at a time when the perception data was obtained.

In Example 11, the system in any of Examples 9-10 further includes a fusion component configured to generate fused sensor data based on the perception data from the at least two sensors, wherein determining the number of lanes comprises determining based on the fused sensor data.

In Example 12, the at least two sensors in any of Examples 9-11 include the rear facing camera and one or more of a LIDAR system, a radar system, an ultrasound sensing system, or an infrared camera system.

In Example 13, the system of any of Examples 9-12 further includes a slope component configured to determine, based on the perception data, road slope in one or more of a vertical direction or a horizontal direction.

In Example 14, the system in any of Examples 9-13 further includes a maneuver component configured to determine one or more of a driving trajectory or collision avoidance options based on the number of lanes.

In Example 15, the report component in any of Examples 9-14 is further configured to upload the indication of the number of lanes to a remote storage location.

In Example 16, the system of Example 15 further includes a location component and a drive history component. The location component is configured to determine a current location of the vehicle. The drive history component configured to: retrieve drive history data from the remote storage location, wherein the drive history indicates one or more of a number of lanes or a slope for the current location; and broadcast the number of lanes or the slope for the current location to one or more vehicle controllers of an automated driving system or driving assistance system.

Example 17 is a computer readable storage media storing instructions that, when executed by one or more processors, cause the processors to receive perception data from at least two sensors, the at least two sensors comprising a rear facing camera of a vehicle. The instructions cause the processors to determine, based on the perception data, a number of lanes on a roadway within a field of view of the perception data using a neural network. The instructions cause the processors to provide an indication of the number of lanes to an automated driving system or driving assistance system.

In Example 18, the computer readable storage media of Example 17 further stores instructions that cause the processors to determine a current lane in which the vehicle is located using a neural network, wherein the current lane corresponds to a lane position of the vehicle at a time when the perception data was obtained.

In Example 19, the computer readable storage media of any of Examples 17-18 further stores instructions that cause the processors to determine one or more of a driving trajectory or collision avoidance options based on the number of lanes.

In Example 20, the computer readable storage media of any of Examples 17-19 further stores instructions that cause the processors to: determine a current location of the vehicle; retrieve drive history data from the remote storage location, wherein the drive history indicates a number of lanes for the current location; and broadcast the number of lanes for the current location to one or more vehicle controllers of an automated driving system or driving assistance system.

Example 21 is a system or device that includes means for implementing a method, system, or device as in any of Examples 1-20.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
  receiving image data of a roadway from a camera of a vehicle;
  receiving perception data measuring reflectivity of the roadway from a source comprising a light detection and ranging (LIDAR) system;
  determining whether there are lane markings on the roadway;
  in response to determining there are no lane markings, estimating a number of lanes on the roadway based on a location of shoulders of the roadway as determined only by the perception data;
  in response to determining there are lane markings, identifying in which lane the vehicle is located on the roadway by processing fused data using a neural network, wherein the fused data comprises the image data and the reflectivity of the roadway as determined by the perception data; and providing an indication of the number of lanes to an automated driving system or driving assistance system, whereby the automated driving system or driving assistance system actuates one or more vehicle controllers based on the indication of the number of lanes.

2. The method of claim 1, wherein identifying in which lane the vehicle is located on the roadway comprises identifying at a time when the perception data and the image data were obtained.

3. The method of claim 1, further comprising receiving sensor data from one or more of a radar system, an ultrasound sensing system, or an infrared camera system.

4. The method of claim 1, further comprising determining, based on the fused data, road slope in one or more of a vertical direction or a horizontal direction.

5. The method of claim 1, further comprising determining one or more of a driving trajectory or collision avoidance option based on the number of lanes.

6. The method of claim 1, further comprising uploading the indication of the number of lanes in a cloud-based drive history that is shared with multiple vehicles.

7. The method of claim 1, further comprising uploading the indication of the number of lanes to a remote storage location.

8. The method of claim 7, further comprising:
determining a current location of the vehicle;
retrieving drive history data from the remote storage location, wherein the drive history indicates a number of lanes for the current location; and
broadcasting the number of lanes for the current location to one or more vehicle controllers of an automated driving system or driving assistance system.

9. A system comprising:
a rearward facing camera of a vehicle;
a source of perception data comprising a light detection and ranging (LIDAR) system of the vehicle; and
a processor that is configurable to execute instructions stored in non-transitory computer readable storage media, the instructions comprising:
receiving image data of a roadway from the rearward facing camera of the vehicle when the vehicle is moving forward on the roadway;
receiving perception data measuring reflectivity of the roadway from the LIDAR system;
determining whether there are lane markings on the roadway;
in response to determining there are no lane markings, estimating a number of lanes on the roadway based on a location of shoulders of the roadway as determined only by the perception data;
in response to determining there are lane markings, identifying in which lane the vehicle is located on the roadway by processing fused data using a neural network, wherein the fused data comprises the image data and the reflectivity of the roadway as determined by the perception data; and
providing an indication of the number of lanes to an automated driving system or driving assistance system, whereby the automated driving system or driving assistance system actuates one or more vehicle controllers based on the indication of the number of lanes.

10. The system of claim 9, wherein identifying in which lane the vehicle is located on the roadway comprises identifying at a time when the perception data and the image data were obtained.

11. The system of claim 9, wherein the determining the number of lanes on the roadway comprises determining based on a matrix comprising the perception data.

12. The system of claim 9, further comprising one or more of a radar system, an ultrasound sensing system, or an infrared camera system, and wherein the instructions further comprise receiving sensor data from one or more of the radar system, the ultrasound sensing system, or the infrared camera system.

13. The system of claim 9, wherein the instructions further comprise determining, based on the fused data, road slope in one or more of a vertical direction or a horizontal direction.

14. The system of claim 9, wherein the instructions further comprise determining one or more of a driving trajectory or collision avoidance options based on the number of lanes.

15. The system of claim 9, wherein the instructions further comprise uploading the indication of the number of lanes to a remote storage location.

16. The system of claim 15, wherein the instructions further comprise:
determining a current location of the vehicle;
retrieving drive history data from the remote storage location, wherein the drive history indicates one or more of a number of lanes or a slope for the current location; and
broadcasting the number of lanes or the slope for the current location to one or more vehicle controllers of an automated driving system or driving assistance system.

17. Non-transitory computer readable storage media storing instructions that, when executed by one or more processors, cause the one or more processors to:
receive image data of a roadway from a rearward facing camera of a vehicle when the vehicle is moving forward on the roadway;
receive perception data measuring reflectivity of the roadway from a source comprising a light detection and ranging (LIDAR) system;
determine whether there are lane markings on the roadway;
in response to determining there are no lane markings, estimate a number of lanes on the roadway based on a location of shoulders of the roadway as determined only by the perception data;
in response to determining there are lane markings, identify in which lane the vehicle is located on the roadway by processing fused data using a neural network, wherein the fused data comprises the image data and the reflectivity of the roadway as determined by the perception data; and
provide an indication of the number of lanes to an automated driving system or driving assistance system, whereby the automated driving system or driving assistance system actuates one or more vehicle controllers based on the indication of the number of lanes.

18. The non-transitory computer readable storage media of claim 17, wherein the instructions cause the one or more processors to identify in which lane the vehicle is located on the roadway by identifying at a time when the perception data and the image data were obtained.

19. The non-transitory computer readable storage media of claim 17, further storing instructions that cause the one or more processors to determine one or more of a driving trajectory or collision avoidance option based on the number of lanes.

20. The non-transitory computer readable storage media of claim 17, further storing instructions that cause the one or more processors to:
- determine a current location of the vehicle;
- retrieve drive history data from a remote storage location, wherein the drive history indicates a number of lanes for the current location; and
- broadcast the number of lanes for the current location to one or more vehicle controllers of an automated driving system or driving assistance system.

\* \* \* \* \*

UNITED STATES PATENT AND TRADEMARK OFFICE
CERTIFICATE OF CORRECTION

PATENT NO. : 10,762,358 B2
APPLICATION NO. : 15/215282
DATED : September 1, 2020
INVENTOR(S) : Myers et al.

It is certified that error appears in the above-identified patent and that said Letters Patent is hereby corrected as shown below:

In the Drawings

In FIG. 4, part of the label "400" have been cut off. Please correct the label so "400" can be clearly identified as shown on the attached drawing sheet.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*